United States Patent
Wu et al.

(10) Patent No.: US 8,680,824 B2
(45) Date of Patent: Mar. 25, 2014

(54) INVERTER CIRCUIT WITH A DRIVER GATE RECEIVING A VOLTAGE LOWER THAN ZERO AND RELATED METHOD FOR SUPPLYING AN INVERTED VOLTAGE

(75) Inventors: Tsan-Huei Wu, Shuilin Township, Yunlin County (TW); Chun-Hsiung Chang, Chupei (TW); Chih-Hua Hou, Chupei (TW); Chiu-Yi Chi, Chupei (TW)

(73) Assignee: Richtek Technology Corporation, Chupei, Hsi-Chu (TW)

( * ) Notice: Subject to any disclaimer, the term of this patent is extended or adjusted under 35 U.S.C. 154(b) by 682 days.

(21) Appl. No.: 12/459,999

(22) Filed: Jul. 10, 2009

(65) Prior Publication Data
US 2010/0134088 A1 Jun. 3, 2010

(30) Foreign Application Priority Data
Dec. 2, 2008 (TW) ................................ 97146831 A

(51) Int. Cl.
*G05F 1/00* (2006.01)

(52) U.S. Cl.
USPC .......................................... 323/271; 323/222

(58) Field of Classification Search
USPC .......................................... 323/222, 271, 282
See application file for complete search history.

(56) References Cited

U.S. PATENT DOCUMENTS

| 7,015,904 | B2* | 3/2006 | Kim ............................... 345/212 |
| 7,095,847 | B2* | 8/2006 | Tsuruya et al. ........... 379/399.02 |
| 2003/0201799 | A1* | 10/2003 | Takauchi et al. .............. 326/127 |
| 2004/0184291 | A1* | 9/2004 | Bachmaier et al. ............. 363/20 |
| 2005/0243602 | A1* | 11/2005 | Umezawa .................. 365/185.11 |
| 2007/0024341 | A1* | 2/2007 | Muggler et al. .............. 327/520 |
| 2007/0236155 | A1* | 10/2007 | Kao et al. ...................... 315/247 |

* cited by examiner

*Primary Examiner* — Adolf Berhane
*Assistant Examiner* — Emily P Pham
(74) *Attorney, Agent, or Firm* — Tung & Associates

(57) ABSTRACT

The present invention discloses an inverter circuit and a method for supplying an inverted voltage. The method for supplying an inverted voltage comprises: providing a power switch and an inductor electrically connected with each other; driving the gate of the power switch by a driver gate, such that an input voltage is converted to a negative voltage supplied to a load; and providing a low operation voltage to the driver gate according to the negative voltage.

20 Claims, 3 Drawing Sheets

INVERTER CIRCUIT WITH A DRIVER GATE RECEIVING A VOLTAGE LOWER THAN ZERO AND RELATED METHOD FOR SUPPLYING AN INVERTED VOLTAGE

BACKGROUND OF THE INVENTION

1. Field of Invention

The present invention relates to an inverter circuit and a method for supplying an inverted voltage; particularly, it relates to an inverter circuit and a method for supplying an inverted voltage, which have good driving capability to drive a power transistor. Such circuit and method for example can be used for supplying a negative voltage to a CCD (Charge Couple Device) circuit, etc.

2. Description of Related Art

An application of an inverter circuit is to provide a negative voltage to a CCD circuit. As shown in FIG. 1, in a prior art inverter circuit 1, a power switch driver control circuit 12 controls a power switch Q via a driver gate 14. By operation of the power switch Q and an inductor L, a voltage Vin from a battery BAT is converted to a negative voltage supplied to a CCD circuit, which requires a negative voltage such as −7V. The power switch driver control circuit 12 obtains a feedback signal from a feedback terminal FB and controls the gate of the power switch Q accordingly. Usually the power switch driver control circuit 12, the driver gate 14, the power switch Q and a 1.25V voltage supply circuit are integrated within an integrated circuit 10.

The abovementioned prior art has the following problem. The high operation voltage and low operation voltage of the driver gate 14 are coupled to the voltage Vin supplied by a battery BAT and ground, respectively; that is, the gate of the power switch Q operates between the voltage Vin and 0V. Typically in CCD application, the battery BAT is two AA batteries supplying a voltage Vin of about 1.8V-3.2V. If the power switch Q is a PMOS, its threshold voltage Vt will be around −1 V. In other words, the circuit only has a driving capability of about 0.8V −2.2V to the gate of the power switch Q, which is too low, and the ON-time resistance of the power switch Q tends to change greatly according to the voltage of the battery BAT.

To solve the foregoing problem, the applicant has proposed the circuit as shown in FIG. 2. In this inverter circuit 2, a negative voltage charge pump 26 is provided in an integrated circuit 20, which switches the connections of the capacitors to generate a negative voltage CPO to be supplied as the low operation voltage for the driver gate 24. As a result, it can significantly improve both the gate driving capability to the power switch Q and the circuit stability. However, this method has the drawback that it requires capacitor devices external to the integrated circuit 20, and the integrated circuit 20 requires multiple additional pins. As shown in the drawing, three additional pins CP, CN, and CPO are required other than the original pins Vin, LX, FB and 1.25V. In consideration of cost, this is not ideal.

In view of the foregoing, the present invention provides an inverter circuit and a method for supplying an inverted voltage to solve the above mentioned problems.

SUMMARY OF THE INVENTION

The first objective of the present invention is to provide an inverter circuit.

The second objective of the present invention is to provide an integrated circuit for use in an inverter circuit.

The third objective of the present invention is to provide a method for supplying an inverted voltage.

In order to achieve the foregoing objectives, according to one perspective of the present invention, it provides an inverter circuit for receiving an input voltage and converting the input voltage to a negative voltage supplied to a load, the inverter circuit comprising: a power switch having a terminal coupled to the input voltage; an inductor having a first terminal coupled to another terminal of the power switch and having a second terminal coupled to ground, the first terminal of the inductor supplies the negative voltage to the load; a driver gate driving a gate of the power switch; and a power switch driver control circuit generating a driver signal to drive the power switch via the driver gate; wherein the driver gate receives a high and a low operation voltage in which the low operation voltage is directly or indirectly obtained from the negative voltage.

In one embodiment, the foregoing inverter circuit further comprises a low operation voltage circuit which receives the negative voltage directly or indirectly, and generates the low operation voltage received by the driver gate.

According to another perspective of the present invention, it provides an integrated circuit for use in an inverter circuit, the inverter circuit comprising a power switch and an inductor electrically connected with each other, the power switch operating to convert an input voltage to a negative voltage supplied to a load, the integrated circuit comprising: a driver gate driving a gate of the power switch; and a power switch driver control circuit generating a driver signal to drive the power switch via the driver gate; wherein the driver gate receives a high and a low operation voltage in which the low operation voltage is directly or indirectly obtained from the negative voltage.

The foregoing power switch can be located inside or outside of the abovementioned integrated circuit.

In one embodiment, the integrated circuit further comprises a low operation voltage circuit which receives the negative voltage directly or indirectly, and generates the low operation voltage received by the driver gate.

According to yet another perspective of the present invention, it provides a method for supplying an inverted voltage comprising: providing a power switch and an inductor electrically connected with each other; driving the gate of the power switch by a driver gate, such that an input voltage is converted to a negative voltage supplied to a load; and providing a low operation voltage to the driver gate according to the negative voltage.

In the abovementioned method, the step of providing the low operation voltage to the driver gate according to the negative voltage includes: coupling a node at which the driver gate receives the low operation voltage to the negative voltage; or providing a low operation voltage circuit which is coupled to a terminal of the load to generate the low operation voltage received by the driver gate; or providing a low operation voltage circuit coupled to a node connected between the inductor and the power switch to generate the low operation voltage received by the driver gate.

The objectives, technical details, features, and effects of the present invention will be better understood with regard to the detailed description of the embodiments below, with reference to the drawings.

DESCRIPTION OF THE PREFERRED EMBODIMENTS

Figure 1:
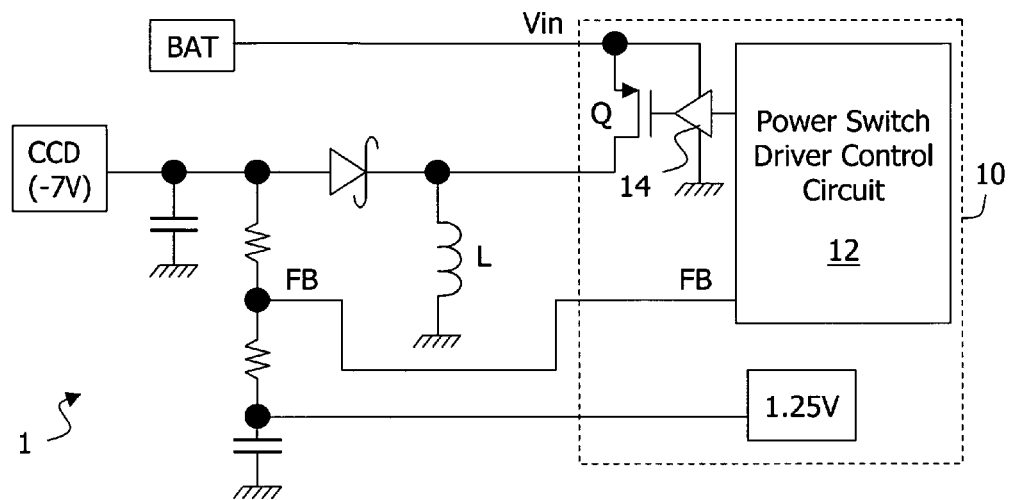
FIG. 1 is a schematic circuit diagram of a prior art inverter circuit.
Figure 2:
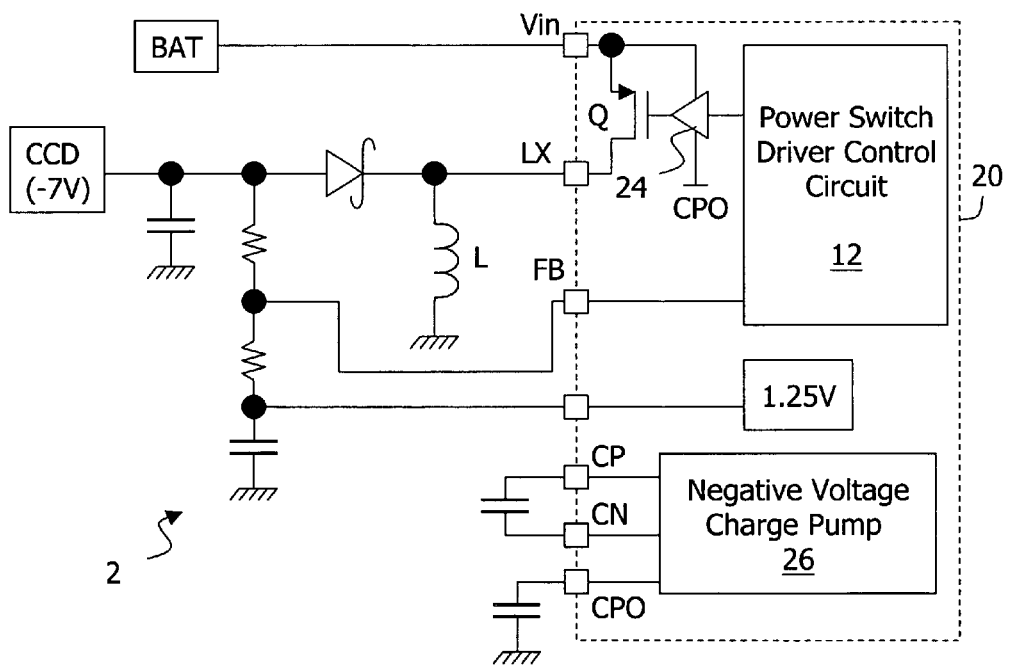
FIG. 2 shows another conventional inverter circuit.
Figure 3:
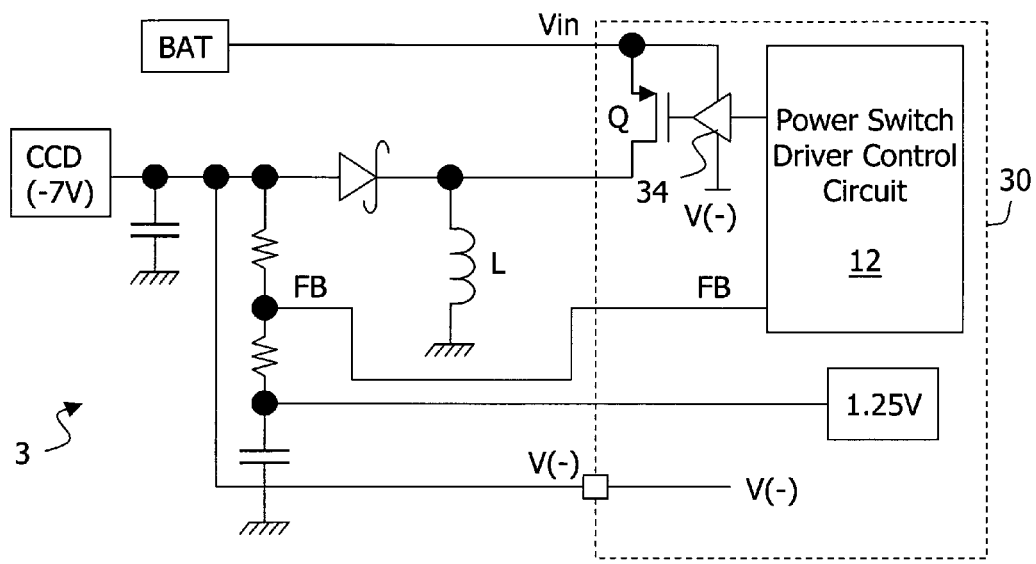
FIGS. 3-5 show three embodiments of the present invention.

In the following embodiments, for illustration, a negative voltage of −7V supplied to a CCD circuit is taken as an example. Yet, the present invention is not limited only to this application; it can also be applied to other applications for supplying a negative voltage other than −7V. FIG. 3 is a schematic circuit diagram showing the first embodiment of the present invention. As shown in the drawing, an inverter circuit 3 according to the present invention retrieves a negative voltage supplied to the CCD circuit and directly supplies it to the inside of an integrated circuit 30, as the low operation voltage V(−) for the driver gate 34. As a result, it considerably enhances the gate driving capability to the power switch Q and the circuit stability. Compared with the prior art in FIG. 2, additional capacitor devices outside of the integrated circuit are not required. In addition, the integrated circuit 30 does not require three pins: CP, CN and CPO, but only requires one pin V(−) as shown; its pin number is less than that of the integrated circuit 20.

Figure 4:
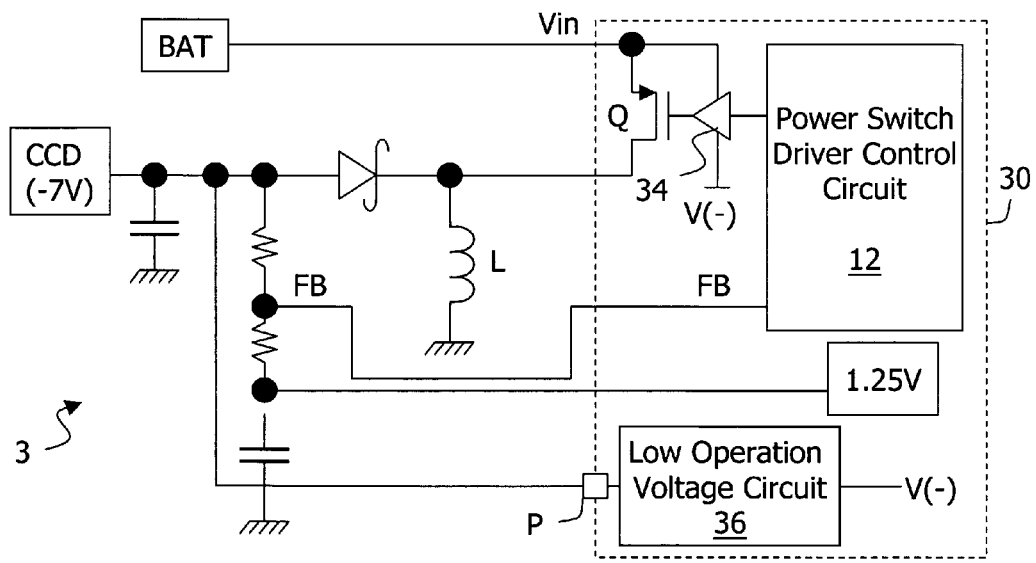

FIG. 4 shows the second embodiment of the present invention, which further provides a low operation voltage circuit 36. This low operation voltage circuit 36 receives the negative voltage supplied to the CCD circuit and converts it to a low operation voltage V(−), which is supplied to the driver gate 34. In other words, the driver gate 34 receives the low operation voltage indirectly (not directly) from the negative voltage supplied to the CCD circuit. The low operation voltage circuit 36 provides the following advantage: in the foregoing first embodiment, because the low operation voltage V(−) is the negative voltage supplied to the CCD circuit, which is a voltage with larger absolute value, certain internal devices of the integrated circuit 30 have to face high voltage directly, which require using high voltage durable devices. Moreover, the negative voltage supplied to the CCD circuit may have a ripple that requires to be filtered. In the second embodiment as shown in FIG. 4, the low operation voltage circuit 36 can provide a voltage drop or filter function as needed, such that the low operation voltage V(−) supplied to the driver gate 34 has a lower absolute value. As a result, the internal devices of the integrated circuit 30 need not face high voltage directly and the circuit stability is increased as well. The low operation voltage circuit 36 for example can be a simple voltage divider circuit, voltage-drop circuit, or filter circuit; certainly, other forms of circuits may also be included.

Figure 5:
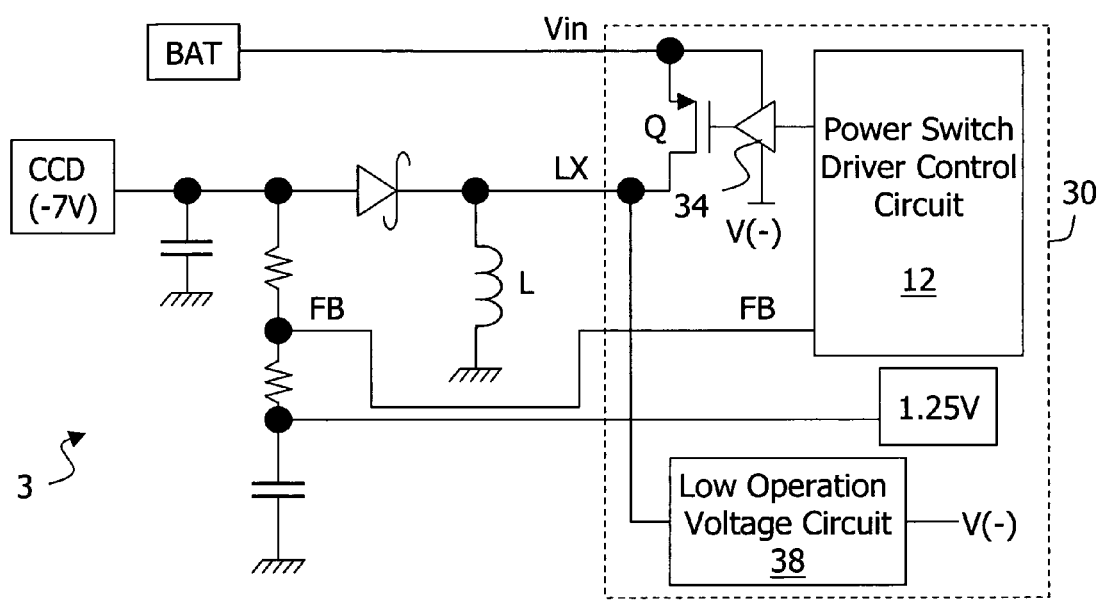

In the two abovementioned embodiments, the negative voltage supplied to the CCD circuit is retrieved into the integrated circuit 30. Yet, the concept of the present invention is not limited only to this. FIG. 5 shows the third embodiment of the present invention which generates a low operation voltage V(−) according to the voltage at a node LX connected between the power switch Q and the inductor L. Such arrangement can also be taken as a form to generate the low operation voltage indirectly from the negative voltage supplied to the CCD circuit. The voltage at the node LX relates to the negative voltage supplied to the CCD circuit, but the current flowing through it varies periodically; it is not a constant. Therefore, the low operation voltage circuit 38 in this embodiment for example may be a direct current (DC) voltage average circuit which obtains a DC voltage average value of the voltage at the node LX and supplies it to the driver gate 34 as the low operation voltage V(−). This embodiment can further include the concept of the second embodiment as shown in FIG. 4. Namely, the low operation voltage circuit 38 can further include the voltage divider circuit, voltage-drop circuit, or filter circuit, other than the DC voltage average circuit.

Because the low operation voltage circuit 38 obtains its input from the voltage at the node LX, it can reduce the pin number of the integrated circuit 30 even more.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the present invention can be used in any application requiring the negative voltage, other than the CCD circuit. As another example, the 1.25V circuit and the external capacitor connected therewith are only preferred but not absolutely required. As yet another example, in certain applications, the power switch Q can be a discrete device provided outside of the integrated circuit. In view of the foregoing, the spirit of the present invention should cover all such and other modifications and variations, which should be interpreted to fall within the scope of the following claims and their equivalents.

What is claimed is:

1. An inverter circuit receiving an input voltage and converting the input voltage to a negative voltage supplied to a load, wherein the negative voltage is lower than 0V, the inverter circuit comprising:
   a power switch having a terminal coupled to the input voltage;
   an inductor having a first terminal coupled to another terminal of the power switch and having a second terminal coupled to ground, the first terminal of the inductor supplies the negative voltage to the load;
   a driver gate driving a gate of the power switch; and
   a power switch driver control circuit generating a driver signal to drive the power switch via the driver gate;
   wherein the driver gate receives a high and a low operation voltage which are not input signals to the driver gate, in which the low operation voltage is lower than 0V and is directly or indirectly obtained from the negative voltage which is converted by the inverter circuit from the input voltage.

2. The inverter circuit of claim 1, wherein a node at which the driver gate receives the low operation voltage is coupled to a terminal of the load.

3. The inverter circuit of claim 1 further comprising a low operation voltage circuit, wherein the low operation voltage circuit receives the negative voltage directly or indirectly and generates the low operation voltage received by the driver gate.

4. The inverter circuit of claim 3, wherein the low operation voltage circuit is coupled to a terminal of the load.

5. The inverter circuit of claim 3, wherein the low operation voltage circuit is coupled to a node connected between the inductor and the power switch.

6. The inverter circuit of claim 3, wherein the low operation voltage circuit includes one selected from a voltage divider circuit, a voltage-drop circuit, and a filter circuit.

7. The inverter circuit of claim 3, wherein the low operation circuit includes a DC (direct current) voltage average circuit.

8. An integrated circuit for use in an inverter circuit, the inverter circuit receiving an input voltage and converting the input voltage to a negative voltage supplied to a load, wherein the negative voltage is lower than 0V, the integrated circuit comprising:

a power switch having a terminal coupled to the input voltage;

a driver gate driving a gate of the power switch; and a power switch driver control circuit generating a driver signal to drive the power switch via the driver gate;

wherein the driver gate receives a high and a low operation voltage which are not input signals to the driver gate, in which the low operation voltage is lower than 0V and is directly or indirectly obtained from the negative voltage which is converted by the inverter circuit from the input voltage.

9. The integrated circuit of claim 8, wherein a node at which the driver gate receives the low operation voltage is coupled to a terminal of the load.

10. The integrated circuit of claim 8 further comprising a low operation voltage circuit for supplying the low operation voltage to the driver gate, the low operation voltage circuit being coupled to a terminal of the load.

11. The integrated circuit of claim 8 further comprising a low operation voltage circuit for supplying a low operation voltage to the driver gate, the low operation voltage circuit being coupled to another terminal of the power switch.

12. An integrated circuit for use in an inverter circuit, the inverter circuit comprising a power switch and an inductor electrically connected with each other, the power switch operating to convert an input voltage to a negative voltage supplied to a load, wherein the negative voltage is lower than 0V, the integrated circuit comprising:

a driver gate driving a gate of the power switch; and a power switch driver control circuit generating a driver signal to drive the power switch via the driver gate;

wherein the driver gate receives a high and a low operation voltage which are not input signals to the driver gate, in which the low operation voltage is lower than 0V and is directly or indirectly obtained from the negative voltage which is converted from the input voltage.

13. The integrated circuit of claim 12, wherein a node at which the driver gate receives the low operation voltage is coupled to a terminal of the load.

14. The integrated circuit of claim 12 further comprising a low operation voltage circuit for supplying the low operation voltage to the driver gate, the low operation voltage circuit being coupled to a terminal of the load.

15. The integrated circuit of claim 12 further comprising a low operation voltage circuit for supplying the low operation voltage to the driver gate, the low operation voltage circuit being coupled to another terminal of the power switch.

16. A method for supplying an inverted voltage comprises:

providing a power switch and an inductor electrically connected with each other;

driving the gate of the power switch by a driver gate, such that an input voltage is converted to a negative voltage supplied to a load, wherein the negative voltage is lower than 0V; and providing a low operation voltage lower than 0V to the driver gate according to the negative voltage, wherein the low operation voltage is not an input signal to the driver gate and the negative voltage is converted from the input voltage.

17. The method of claim 16, wherein the step of providing the low operation voltage to the driver gate according to the negative voltage includes: coupling a node at which the driver gate receives the low operation voltage to the negative voltage.

18. The method of claim 16, wherein the step of providing the low operation voltage to the driver gate according to the negative voltage includes: providing a low operation voltage circuit which receives the negative voltage directly or indirectly and generates the low operation voltage received by the driver gate.

19. The method of claim 18, wherein the low operation voltage circuit is coupled to a terminal of the load.

20. The method of claim 18, wherein the low operation voltage circuit is coupled to a node connected between the inductor and the power switch.

* * * * *